United States Patent [19]

Chapa

[11] 4,007,940
[45] Feb. 15, 1977

[54] PROTECTED MECHANICAL SEAL

[76] Inventor: Roman Chapa, 4448 Fair St., Pico Rivera, Calif. 90660

[22] Filed: July 7, 1975

[21] Appl. No.: 593,629

[52] U.S. Cl. ............................. 277/32; 277/93 R
[51] Int. Cl.$^2$ ..................................... F16K 41/00
[58] Field of Search .............. 277/32, 93 R, 85, 41

[56] References Cited
UNITED STATES PATENTS

| | | | |
|---|---|---|---|
| 2,856,210 | 10/1958 | Schoenrock | 277/89 X |
| 3,420,535 | 1/1969 | Hershey | 277/93 X |
| 3,612,548 | 10/1971 | Tracy | 277/41 |

*Primary Examiner*—Richard E. Aegerter
*Assistant Examiner*—L. Footland
*Attorney, Agent, or Firm*—Louis J. Bachand

[57] ABSTRACT

An improvement in a mechanical seal assembly for a slurry pump, or like shaft rotating in a housing subject to incursions of grit contaminants of the type having relatively rotating first and second seal elements in annular engagement defining the seal, the first of the seal elements comprising telescopically interfitted inner and outer cylindrical members having seal-wear-responsive extensile movement to maintain sealing engagement with the second seal element, the grit contaminants tending to work between the first element inner and outer members and block their telescoping movement; the improvement comprising a rigid cylindrical shroud axially opposing and radially enclosing the first element concentrically for a substantial distance against grit contamination blocking inner and outer member telescoping movement.

9 Claims, 4 Drawing Figures

PROTECTED MECHANICAL SEAL

This invention has to do with improvements in mechanical seal assemblies and, more particularly, with apparatus for protecting mechanical seal assemblies from malfunction due to the immobilizing immuring of grit in the wear-responsive self-adjusting seal mechanism of such assemblies.

BACKGROUND OF THE INVENTION

Mechanical seals are devices primarily to seal rotating shafts turning relative to a housing, to protect the motor from the fluids be they slurry, suspension, or clear but corrosive, liquids immersing the impeller of a pump. As such, mechanical seals are often used in replacement of packing which is laid around the shaft in stuffing boxes. In general, the mechanical seal comprises a first element cylindrical in nature carrying on an axial face a generally circular sealing material, secured to the shaft to rotate therewith and a second element which is torodial in nature, secured to the housing wall and which carries, on an axial face opposite the first element axial sealing face a sealing material, generally coaxial with the shaft and in which the shaft turns freely. The seal defined by the opposed circular sealing materials is annular in configuration, and is defined by the interface of the engaged first and second parts. To accommodate progressive wear at the seal-forming interface, the rotating member is designed to be self-adjustable axially of the shaft. For this purpose, the first element comprises an inner and outer cylindrical member which are telescopically interfitted with a compression spring bias to progressively extend or elongate the first element of the seal assembly as the sealing materials wear, to maintain sealing engagement between the first and second elements.

Generally, the inner and outer members of the first element are keyed together for rotation with the shaft and at the same time guided in their axial relative movement by pins or tongues carried by one member which extend into mating structure in the opposite member. Thus, the inner and outer cylindrical members define an annular intermember space which may be filled with stiff or highly viscous fluid such as silicone grease as desired, e.g. through the axial face.

PRIOR ART

In use applications where grit incursions into the housing are to be encountered, e.g. in the pumping of slurries, grit contaminants have been found to work their way into self-adjusting mechanism of the first element whether the course of entry is through the ports usually and necessarily found in the outer member (for fastener ajustment) or elsewhere. It is established that the first element is subject to entrance of grit contaminants and that these contaminants may be large enough or numerous enough to prevent ultimately the telescopic extensile movement of the first member inner and outer members.

Where the grit enters the intercylindrical spacing between the first element members or where such grit accumulates in the guide structure, the adjustability of the first element is limited, and with continuing wear, loss of sealing occurs although much seal material remains. At this point, following wear at the seal interface, the seal is lost and the pump must be shut down and the seal replaced. Such seal failures can greatly shorten the working life of a mechanical seal and necessitate its replacement at unduly frequent intervals, such as a matter of mere weeks. Downtime and maintenance costs are unreasonably high.

SUMMARY OF THE INVENTION

It is therefore an object of the present invention to provide an improvement in mechanical seal assemblies of the self-adjusting two-element type. It is a further object to provide an improvement in mechanical seals whereby entry of grit from slurries and the like into the guide structure and/or the intercylindrical space of the adjustable first element of a mechanical seal, is prevented. It is a still further object to provide means to radially enclose the first, extensile, adjustable element and the guide structure between first element inner and outer members to insure continued free movement of these members during seal operation.

In accordance with the foregoing, and other objects to become apparent hereinafter, the invention provides in a mechanical seal assembly for a slurry pump or like shaft rotating in a housing subject to incursions of grit contaminants, relatively rotating first and second seal elements in annular engagement defining the seal, the first of said seal elements comprising telescopically interfitted inner and outer cylindrical members having seal-wear-responsive extensile movement to elongate said first element, the grit contaminants tending to work between the first element members and block their telescoping movement, the improvement of a third element comprising a rigid cylindrical shroud axially opposing and radially enclosing the first element concentrically against grit contamination blocking of inner and outer member telescoping movement. The inner and outer first seal element members cooperatively define an annular space, and the invention contemplates use of a viscous fluid material to fill the space.

In particular embodiments, the mechanical seal assembly according to the invention further includes: compression spring structure resiliently biasing the first seal element inner and outer members axially apart; the second seal element comprising a torus supported by the housing; the first seal element outer member carrying a sealing surface in sealing engagement with the torus; the first seal element inner members being secured to the shaft for rotation therewith, and an O-ring seal in sealing engagement between the shaft and the first seal element inner member.

Further contemplated in the invention is provision of a cup-shaped shroud element having a relatively thick cross section base and a relatively thin cross section cylindrical wall, e.g. in a ratio of not less than 25 of the base section to the wall section, means securing the inner member to the shaft for rotation therewith, and separate means securing the shroud element to the shaft in inner member axially abutting relation, and free of radial engagement with the first element to block grit contaminants from between the first element inner and outer members while commonly rotating with the shaft and first element. In embodiments in which the first element and the shroud element are secured for simultaneous rotation, the invention contemplates: use of compression spring structure between the first element inner and outer members resiliently maintaining the outer member in self-adjusting sealing engagement with the toroidal second element; guide means between the inner and outer members guiding relative axial movement of the members; the outer cylindrical member having circularly spaced slots, the inner cylindrical member having threaded fasteners defining means to secure the inner cylindrical member to the shaft in registration with the outer member slots for adjustment access; and the shroud element overlying the outer cylindrical member slots in grit blocking relation.

BRIEF DESCRIPTION OF THE DRAWINGS

The invention will be further described as to an illustrative embodiment thereof in conjunction with the attached drawings in which.

DESCRIPTION OF THE PREFERRED EMBODIMENTS

The present rotary mechanical seal assembly apparatus is designed to protect shaft power systems and their housings from leakage of fluids being processed, such as particularly slurries of aqueous or organic liquid base containing metallic, mineral or organic particulate material, where seal failure has been a difficult problem, because of the self-adjustment mechanism "freezing" with accumulated contaminant debris. Materials of construction are conventional with chemically resistant hard metal alloys being materials of choice for all elements of the apparatus. The size both axially and radially of the apparatus is determined by seal needs and available space for the assembly apparatus and these parameters may be established for a given use opportunity as with prior known mechanical seals, taking into account the slight increase e.g. typically 1/64 in. more or less in radial dimension occasioned by the shroud element wall and the increase in axial length attributable to the shroud element base, typically 25/64 in., more or less.

Figure 1:
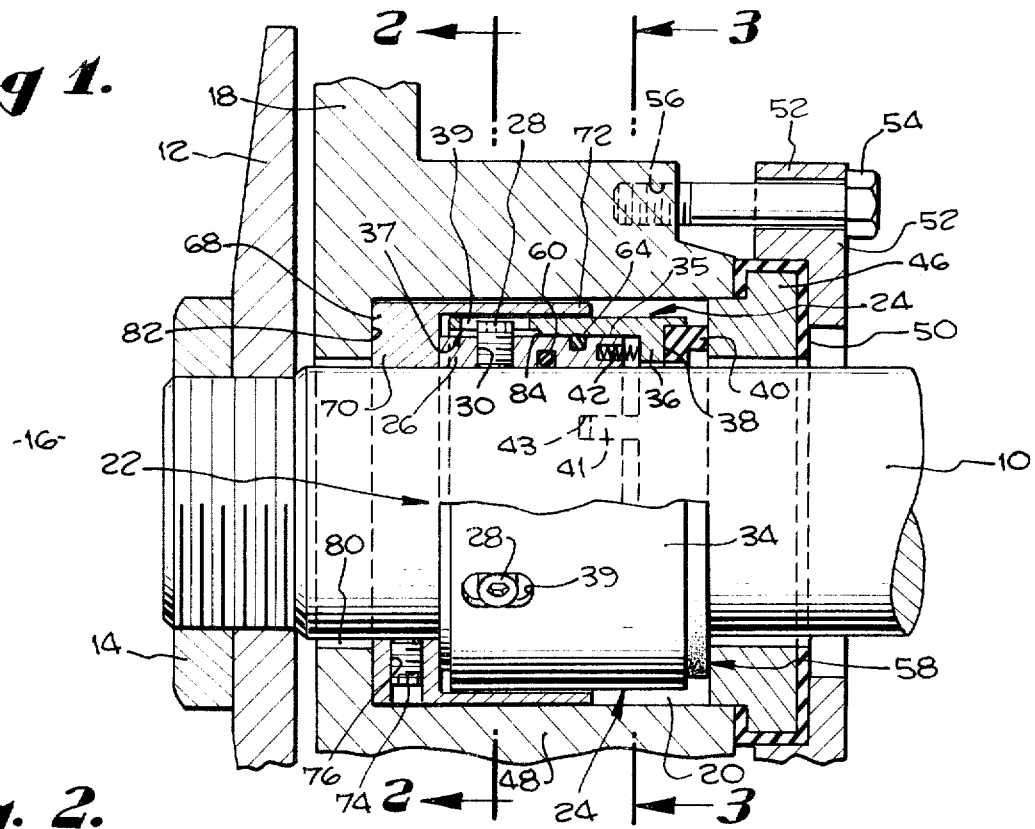
FIG. 1 is a side elevational view of the improved mechanical seal assembly apparatus of the invention.
Figure 2:
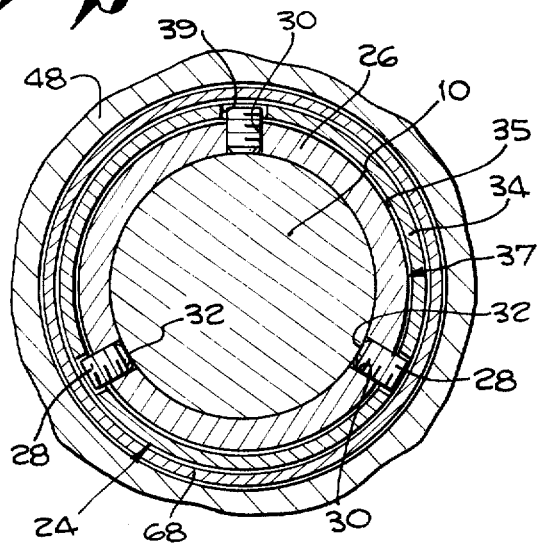
FIG. 2 is a vertical section thereof taken on line 2—2 in FIG. 1.
Figure 3:
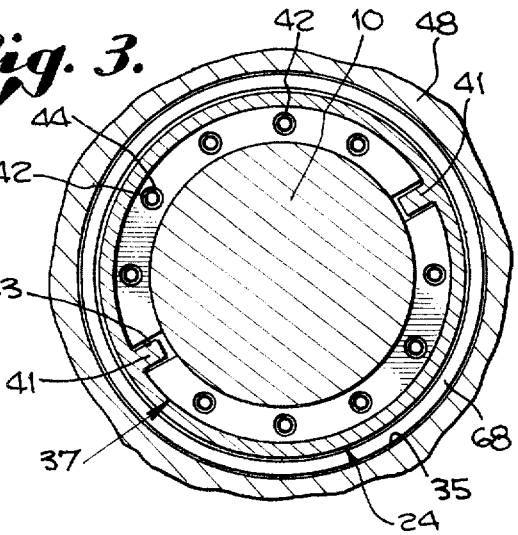
FIG. 3 is a vertical section of the apparatus taken on line 3—3 in FIG. 1.

With reference now to the drawings in detail, in FIGS. 1 — 3 shaft 10 carries impeller 12 secured by nut 14 in pump cavity 16. The shaft 10 extends through a housing including wall 18 between cavity 16 and a motor (not shown) supported by bearings also not shown. The housing wall 18 has flange 48 which defines a seal chamber 20 in which mechanical seal assembly 22 is fitted.

The mechanical seal assembly includes a first extensile element 24 comprising a cylindrical inner member 26 secured to the shaft 10 by Allen fasteners 28 threaded into radially disposed holes 30 in member 26 in equally circularly spaced relation about the member circumference to engage the shaft at points 32, and an outer cylindrical member 34 concentric with the inner member and the shaft 10 and having an internal annular flange 36 defining an axial recess 38 into which sealing material annulus 40 is securely fitted. The sealing material may be Teflon (Registered Trade Mark) polytetrafluoroethylene polymer or like long wearing, tough, chemically inert material. The intercylindrical space 35 may be fitted with viscous fluid such as silicone grease 37 as shown. The Allen fasteners 28 are accessible through slots 39 in member 34. A circular series of compression springs 42 supported in inner member axial holes 44 engage the opposing flange 36 and resiliently bias the outer member 34 axially away from the inner member guide keys 41 in guideways 43 keeping the relative movement of members 26 and 34 axial and not rotational.

The second element of the assembly 22 is ring 46 suitably sized and shaped to interfit housing flange 48 and provided with a toroidal sealing material covering 50, the ring and its covering being supported by the housing flange secured to be stationary there by annular clamp 52 and bolts 54 threaded into tapped holes 56 in the housing flange.

Figure 4:
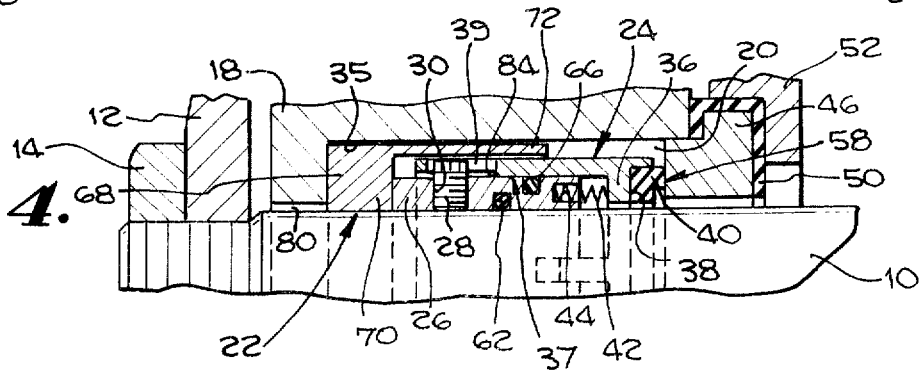
FIG. 4 is a detailed view somewhat enlarged of the apparatus modified as after usage, showing axial self-adjustment of the assembly responsive to seal wear.

The extensible first element 22 rotating with the shaft and the stationary second element cooperate to define an annular locus of sealing at 58. Sealing effects wear. As best shown in FIG. 4 progressive reduction in the sealing materials 40, 50 enables the outer cylindrical member 34 to be displaced toward ring 46 and a sealing locus 581 is maintained thus by the compression springs 42 resiliently urging the outer member 34 axially away from the inner member 26.

Sealing is completed by an inner O-ring 60 in inner annular groove 62 of the inner member and engaging the shaft; and an outer O-ring 64 in outer annular groove 66 engaging the outer member 34.

Thus far described the mechanical seal assembly is conventional and may be procured commercially e.g. Model 770 mechanical seal from A-W Chesterton Company of Woburn, Massachusetts.

The invention provides a third element, a cup-shaped shroud 68 having a relative thick cross-section base 70 e.g. 25/64 in. and a relatively thin cross-section cylindrical wall 72 e.g. 1/64 in. which concentrically overlies the assembly of first and second seal elements 26, 34 above described. As thus emplaced the base portion 70 is secured to the shaft 10 independent of the inner member 26, by set screw 74 in radial tapped opening 76. The axial extent of the wall 72 is such as to cover the access slots 39 in outer member 34 whereby grit contamination (not shown) passing the housing wall 18 from cavity 16 i.e. into annular clearance 80 about the shaft 10 is initially blocked by base 70 of the third element shroud 68 by the nominal mechanical clearance at 82 with grit passing this point being guided beyond the critical moving surfaces 84 and openings 39 by the shroud wall 72, whereby first seal element 24 extends telescopically free of blocking grit accumulations between surfaces 84 and in openings 39. This protective relationship of shroud 68 to first element members 26, 34 continues as the seal wears (See FIG. 4). Thereby effective seal life is greatly prolonged.

I claim:

1. In a mechanical seal assembly for a slurry pump or like shaft rotating in a housing subject to incursions of grit contaminants, relatively rotating first and second seal elements in annular egagement defining the seal, the first of said seal elements comprising telescopically interfitted inner and outer cylindrical members having seal-wear-responsive extensile movement to maintain sealing engagement with said second seal element, said grit contaminants tending to work between said first element members and block their telescoping movement, the improvement of a third element comprising a rigid cylindrical shroud axially opposing and radially enclosing said first element concentrically, said shroud being cup-shaped having a relatively thick cross-section base and a relatively thin cross-section cylindrical wall, and means securing said first element inner member to said shaft for rotation therewith, and separate means securing said shroud to said shaft in inner member axially abutting relation free of radial engagement with said first element, to block grit contaminants from between said first element inner and outer members while commonly rotating with the shaft and first element.

2. Mechanical seal assembly according to claim 1 in which said inner and outer first element members cooperatively define an annular space, and including also viscous fluid material filling said space.

3. Mechanical seal assembly according to claim 1 including also compression spring structure resiliently biasing said first seal element inner and outer members axially apart.

4. Mechanical seal assembly according to claim 1 in which said second seal element comprises a torus supported by said housing, said first seal element outer member carries a sealing surface in sealing engagement with said torus, and said first seal element inner member is secured to said shaft for rotation therewith and including also an O-ring seal in sealing engagement between said shaft and said first seal element inner member.

5. Mechanical seal assembly according to claim 1 including also compression spring structure between said first element inner and outer members resiliently maintaining said outer member in self-adjusting sealing engagement with said toroidal element.

6. Mechanical seal assembly according to claim 5 including also guide means between said inner and outer members guiding relative axial movement of said members.

7. Mechanical seal assembly according to claim 6 in which said outer member has circularly spaced slots, and said inner member has threaded fasteners defining means to secure the inner cylindrical member to said shaft, in registration with said outer cylindrical member slots for adjustment access.

8. Mechanical seal assembly according to claim 7 in which said shroud overlies said outer cylindrical member slots, in grit blocking relation.

9. Mechanical seal assembly according to claim 1 in which the thickness ratio of base to wall section is above 25.

* * * * *